UNITED STATES PATENT OFFICE.

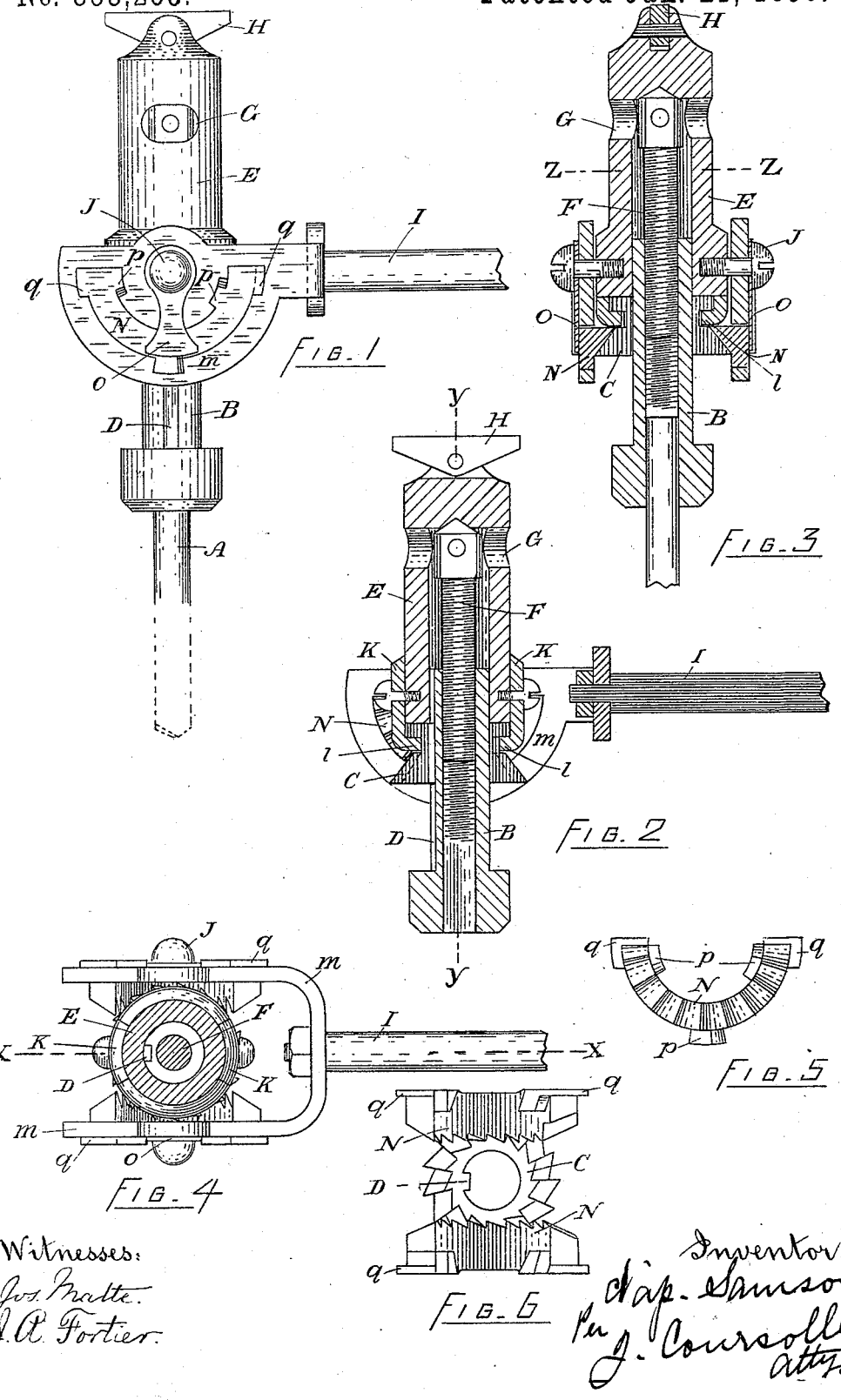

NAPOLEON SAMSON, OF RIVIERE DU LOUP, CANADA, ASSIGNOR OF ONE-HALF TO LOUIS P. BEAULIEU, OF LOWELL, MASSACHUSETTS.

RATCHET-DRILL.

SPECIFICATION forming part of Letters Patent No. 553,263, dated January 21, 1896.

Application filed May 20, 1895. Serial No. 550,002. (No model.)

*To all whom it may concern:*

Be it known that I, NAPOLEON SAMSON, a citizen of Canada, residing at Riviere du Loup, (en bas,) in the county of Temiscouata and Province of Quebec, Canada, have invented new and useful Improvements in Ratchet-Drills, of which the following is a specification.

My invention relates to improvements in ratchet-drills which are worked by hand, and the object I have in view is to produce an implement for drilling holes in metal that will combine simplicity of construction with an effectiveness in operation not obtained in any devices of this class hitherto known or used.

My invention is embodied in the arrangement and combination of the several features which are hereinafter described, and shown in the accompanying drawings, in which—

Figure 1 is a side elevation of my ratchet-drill; Fig. 2, a sectional elevation on line $xx$, Fig. 4; Fig. 3, a sectional elevation on line $yy$, Fig. 2; Fig. 4, a plan view on line Z Z, Fig. 3. Fig. 5 is a detached view of the semicircular rack. Fig. 6 is a part detail sketch of racks and pinion.

The drill-bit shown at A is held in the bit-socket B, which slides easily through the eye of a ratchet-pinion C, and which has formed in it a feather-groove D, which is for the purpose of engaging a feather or fixed key secured in the eye of the pinion so as to cause the pinion and bit-socket to turn together.

E is the body of the drill. It is chambered to a point near its top end to receive the upper part of the bit-socket.

F is a feed-screw, having an enlarged top or head, and threaded to engage in the screw-threaded chamber of the bit-socket. By turning this screw the bit-socket may be pushed outward or drawn in, or holding the screw and turning the bit-socket the latter may be moved out or inward. The screw may be held by placing a pin or bar through the holes shown in its head. Openings G are made in the body E to give access to the screw-head. The top of the screw-head holds against the top end of the chamber in the body E. When in use the tops of these ratchet-drills are generally braced against some fixed object, and on this account I have introduced a bearing-block H, pivoted between lugs on the end of the body, so as to suit different slopes. On the lower end of the body there is formed a boss, or enlarged part, to which the working handle I is pivoted by the screw-pins J. Portions of this enlargement are cut away, and these gaps are filled by removable segments K, held in place by screws, and having inturned collars $l$ on their bottom ends. These collars extend into a crease formed in the hub of the pinion C and hold it in place. The inner end of the handle I is bifurcated, forming the two wings $m$, which are made broad vertically so as to allow space within them for the openings which receive and hold the circular toothed racks N, which engage with the pinion C and operate it. The centers of the screw-pins J are the centers of the circular racks. The teeth of these racks and the pinion are saw-tooth shaped, and each engages only in one direction. The racks are held in place in the wings of the handle by the springs O, which are secured to the outside of the wings by the heads of the screw-pins J. When one of the racks is moved backward past the pinion, so as to get a fresh hold upon its teeth, the spring O allows it to recede from the pinion sufficiently to clear its teeth, and as the movement of the handle I, which gives backward motion to one rack gives forward motion to the other, (see Fig. 6,) it follows that each motion of the handle turns the drill a bit forward. As further means for preventing the crowding outward of the racks by the working of the pinion against them, there are formed on the edges of the racks lugs $p$, having sloping faces, and gaps are made in the wings $m$ to receive these lugs. At the ends of these gaps the metal is sloped away to correspond with the sloping faces of the lugs $p$. The object of this is that the resistance of the pinion may not overcome the strength of the spring O and force the racks outward. The lips $q$ are formed on the ends of the racks to overlie the faces of the wings $m$ and so prevent the racks from falling inward.

From the above description it will be seen that my improved drill possesses a great advantage over the drills now in common use, and in which one-half of the time of operating them is lost, as each return movement of the working handle is ineffective, whereas in my drill, herein described, both the upward and downward swing of the handle operate the drill, giving it a continuous onward motion, so long as the handle is moved in either direction.

What I claim is—

1. In a ratchet drill, the combination of a body chambered to receive a bit-socket and a handle having its end bifurcated to span said body and pivoted to it at opposite points, with two circular toothed-racks held by springs and lugs in openings formed in the divided end of said handle, said racks arranged to engage alternately with opposite sides of a toothed pinion held to the end of the aforesaid body by collars secured to said body.

2. In a ratchet drill, the combination of a ratchet toothed pinion centered on a bit socket and arranged to be operated upon alternately by two removable circular racks set in the wings of a bifurcated handle pivoted to the sides of a chambered body, said racks being held in place by springs attached to said wings.

3. A ratchet drill in which the working handle has its pivoted end divided to form the two wings $m$, which are pivoted to the body E by pins J screwed into it, said wings having openings in them, and the circular toothed-racks held in said openings by the lugs $p$ on said racks, and the springs O secured to said wings, the parts being combined substantially as set forth.

4. In the above-described ratchet drill, the combination of the toothed-racks N set in openings in the wings $m$ of the working handle, provided with the lugs $p$, having sloping faces, and lips $q$, and held in place by springs O, substantially as described.

Signed at Riviere du Loup this 2d day of April, 1895.

NAPOLEON SAMSON.

In presence of—
 E. TALBOT,
 CYP. DIONNE.